United States Patent
Wang et al.

(10) Patent No.: US 11,847,790 B2
(45) Date of Patent: *Dec. 19, 2023

(54) THREE-DIMENSIONAL CAMERA SYSTEM

(71) Applicant: Samsung Electronics Co., Ltd., Suwon-si (KR)

(72) Inventors: Yibing Michelle Wang, Temple City, CA (US); Kwang Oh Kim, Cerritos, CA (US); Lilong Shi, Pasadena, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,068

(22) Filed: Sep. 12, 2022

(65) Prior Publication Data

US 2023/0005170 A1    Jan. 5, 2023

Related U.S. Application Data

(63) Continuation of application No. 16/894,705, filed on Jun. 5, 2020, now Pat. No. 11,443,447.

(60) Provisional application No. 63/011,826, filed on Apr. 17, 2020.

(51) Int. Cl.
*G06T 7/521* (2017.01)

(52) U.S. Cl.
CPC .... *G06T 7/521* (2017.01); *G06T 2207/10028* (2013.01); *G06T 2207/10152* (2013.01)

(58) Field of Classification Search
CPC ........... G06T 7/521; G06T 2207/10028; G06T 2207/10152; G01S 7/4816; G01S 7/4817; G01S 7/4863; G01S 7/4865; G01S 17/48; G01S 17/86; G01S 17/894; H04N 13/254; H04N 13/271; H04N 13/204; H04N 23/56

See application file for complete search history.

(56) References Cited

U.S. PATENT DOCUMENTS

| | | |
|---|---|---|
| 7,262,402 B2 | 8/2007 | Niclass et al. |
| 7,483,151 B2 | 1/2009 | Zganec et al. |
| 7,852,461 B2 | 12/2010 | Yahav |
| 8,633,431 B2 | 1/2014 | Kim |
| 8,639,046 B2 | 1/2014 | Aggarwal |
| 8,681,255 B2 | 3/2014 | Katz et al. |

(Continued)

FOREIGN PATENT DOCUMENTS

| | | |
|---|---|---|
| DE | 10132616 A1 | 1/2003 |
| DE | 10145678 A1 | 4/2003 |

(Continued)

OTHER PUBLICATIONS

Mandai, et al., "Ultra High Speed 3-D Image Sensor," International Image Sensor Workshop (IISW), Jun. 2009, 4 pages.

(Continued)

*Primary Examiner* — Dramos Kalapodas
(74) *Attorney, Agent, or Firm* — Lewis Roca Rothergerber Christie LLP

(57) ABSTRACT

A camera system. In some embodiments, the camera system includes a first laser, a camera, and a processing circuit connected to the first laser and to the camera. The first laser may be steerable, and the camera may include a pixel including a photodetector and a pixel circuit, the pixel circuit including a first time-measuring circuit.

20 Claims, 4 Drawing Sheets

(56) References Cited

U.S. PATENT DOCUMENTS

| | | | |
|---|---|---|---|
| 8,698,084 B2 | 4/2014 | Jiang et al. | |
| 8,786,678 B2 | 7/2014 | Schmidt et al. | |
| 8,981,277 B2 | 3/2015 | He | |
| 9,006,641 B2 | 4/2015 | Drader | |
| 9,082,676 B2 | 7/2015 | Kurokawa | |
| 9,377,533 B2 | 6/2016 | Smits | |
| 9,652,692 B1* | 5/2017 | McGarry | H04N 25/00 |
| 9,753,126 B2* | 9/2017 | Smits | G01S 17/10 |
| 9,876,975 B2 | 1/2018 | Yoshida et al. | |
| 9,888,191 B2* | 2/2018 | Beck | H04N 25/59 |
| 10,132,616 B2 | 11/2018 | Wang | |
| 10,145,678 B2 | 12/2018 | Wang et al. | |
| 10,215,857 B2 | 2/2019 | Oggier et al. | |
| 10,942,261 B2 | 3/2021 | Wang | |
| 2001/0046317 A1 | 11/2001 | Kamon et al. | |
| 2002/0196243 A1 | 12/2002 | Morita | |
| 2005/0128327 A1* | 6/2005 | Bencuya | H01L 27/14643 348/308 |
| 2006/0221250 A1 | 10/2006 | Rossbach et al. | |
| 2007/0182949 A1 | 8/2007 | Niclass | |
| 2009/0244309 A1 | 10/2009 | Maison et al. | |
| 2011/0025827 A1 | 2/2011 | Shpunt et al. | |
| 2011/0102763 A1 | 5/2011 | Brown et al. | |
| 2011/0254986 A1 | 10/2011 | Nishimura et al. | |
| 2012/0038809 A1 | 2/2012 | Lee et al. | |
| 2012/0204094 A1 | 8/2012 | Liang | |
| 2012/0246899 A1 | 10/2012 | Yamada et al. | |
| 2013/0127854 A1 | 5/2013 | Shpunt et al. | |
| 2014/0021356 A1 | 1/2014 | Zwaans et al. | |
| 2014/0022348 A1 | 1/2014 | Shpunt | |
| 2014/0027613 A1 | 1/2014 | Smith | |
| 2014/0055565 A1 | 2/2014 | You et al. | |
| 2014/0078381 A1 | 3/2014 | Ovsiannikov et al. | |
| 2014/0103192 A1* | 4/2014 | Lee | H01L 27/1464 250/208.1 |
| 2014/0103196 A1 | 4/2014 | Soga et al. | |
| 2014/0232822 A1 | 8/2014 | Venkataraman et al. | |
| 2014/0232827 A1 | 8/2014 | Kumar et al. | |
| 2014/0300701 A1 | 10/2014 | Park et al. | |
| 2014/0347443 A1 | 11/2014 | Cohen et al. | |
| 2014/0354539 A1 | 12/2014 | Skogo et al. | |
| 2015/0001664 A1 | 1/2015 | Van Der Tempel et al. | |
| 2015/0062306 A1 | 3/2015 | Ayyagari et al. | |
| 2015/0062558 A1 | 3/2015 | Koppal et al. | |
| 2015/0177369 A1 | 6/2015 | Kostamovaara | |
| 2017/0097417 A1 | 4/2017 | Wang | |
| 2019/0154439 A1 | 5/2019 | Binder | |
| 2019/0174084 A1* | 6/2019 | Kuo | H04N 25/772 |
| 2019/0231220 A1 | 8/2019 | Refai et al. | |
| 2020/0180733 A1 | 6/2020 | Prevel et al. | |
| 2020/0284883 A1* | 9/2020 | Ferreira | G01S 17/10 |
| 2021/0396856 A1* | 12/2021 | Dominguez Castro | H04N 25/65 |

FOREIGN PATENT DOCUMENTS

| | | | | |
|---|---|---|---|---|
| DE | 10215857 A1 | 10/2003 | | |
| DE | 102004037137 A1 | 3/2006 | | |
| EP | 2026035 A2 | 2/2009 | | |
| EP | 2159603 A1 | 3/2010 | | |
| EP | 2159603 B1 | 11/2011 | | |
| EP | 3657205 A1 * | 5/2020 | | G01S 17/10 |
| JP | 2013-104784 A | 5/2013 | | |
| KR | 10-2017-0054221 A | 5/2017 | | |
| WO | WO 2010/139609 A1 | 12/2010 | | |
| WO | WO 2014/204111 A1 | 12/2014 | | |
| WO | WO 2019/086495 A1 | 5/2019 | | |

OTHER PUBLICATIONS

Matsuda, et al., "MC3D: Motion Contrast 3D Scanning," 2015 IEEE International Conference on Computational Photography (ICCP), Apr. 2015, 10 pages.

Oike, et al., "A 375 x 365 High-Speed 3-D Range-Finding Image Sensor Using Row-Parallel Search Architecture and Mutisampling Technique," IEEE Journal of Solid-State Circuits, vol. 40, No. 2, Feb. 2005, 10 pages.

O'Toole, et al., "Homogeneous Codes for Energy-Efficient Illumination and Imaging," ACM SIGGRAPH, 2015 13 pages.

F. Blais et al., "Range Error Analysis of an Integrated Time-of-Flight, Triangulation, and Photogrammetry 3D Laser Scanning System," SPIE Proceedings of AeroSense, Orlando, Fla., Apr. 24-28, 2000, vol. 4035. (Year: 2000).

* cited by examiner

THREE-DIMENSIONAL CAMERA SYSTEM

CROSS-REFERENCE TO RELATED APPLICATION(S)

This application is a continuation of U.S. patent application Ser. No. 16/894,705, filed on Jun. 5, 2020, which claims priority to and the benefit of U.S. Provisional Application No. 63/011,826, filed on Apr. 17, 2020, entitled "A 3D CAMERA SYSTEM BASED ON TRIANGULATION AND DTOF PRINCIPLES", the entire content of all of which is incorporated by reference herein.

FIELD

One or more aspects of embodiments according to the present disclosure relate to camera systems, and more particularly to a camera system with dual distance-measuring capabilities.

BACKGROUND

In a three-dimensional imaging system, two cameras, or a scanning laser and a camera, may be used to form three-dimensional images, by supplementing transverse position information about an imaged object, obtained from an image, with distance or "range" information obtained, for example, by triangulation. Triangulation may provide good accuracy for objects that are close to the three-dimensional imaging system but the accuracy of a distance measurement using triangulation may be poor for distant objects.

Thus, there is a need for an improved three-dimensional camera system.

SUMMARY

According to an embodiment of the present invention, there is provided a camera system, including: a first laser; a camera; and a processing circuit connected to the first laser and to the camera, the first laser being steerable, the camera including a pixel including a photodetector and a pixel circuit, the pixel circuit including a first time-measuring circuit.

In some embodiments, the first time-measuring circuit has a precision of 10 ns.

In some embodiments: the first time-measuring circuit includes a time to digital converter circuit, and the pixel circuit further includes a register for storing a count generated by the time to digital converter circuit.

In some embodiments, the time to charge converter circuit includes a counter, the counter being configured to start counting upon receipt of start trigger, and, upon receipt of a detection pulse from the photodetector, to store a count value in the register.

In some embodiments, the first time-measuring circuit includes a time to charge converter circuit.

In some embodiments, the camera system further includes a sensing circuit connected between the photodetector and the first time-measuring circuit, the sensing circuit including an amplifier and a comparator.

In some embodiments, the first laser is steerable in one dimension and configured to produce line illumination.

In some embodiments, the first laser is steerable in two dimensions.

In some embodiments, the first time-measuring circuit has a precision of 1 ns.

In some embodiments, the processing circuit is configured: in a first mode, to cause the first laser to scan; and in a second mode, to cause the first laser to produce a flash having a rising edge with a duration of at most 100 ns.

In some embodiments, the processing circuit is configured: to measure a distance to a first object using triangulation; to determine that the first object is more distant than a threshold distance; to cause the first laser to illuminate the first object with the flash; and to measure a distance to the first object using a direct time of flight measurement.

In some embodiments, the camera system further includes a second laser, wherein the processing circuit is configured: to scan the first laser and to measure a distance to a first object using triangulation; to determine that the first object is more distant than a threshold distance; to cause the second laser to illuminate the first object with the flash; and to measure the distance to the first object using a direct time of flight measurement.

In some embodiments, the processing circuit is configured to configure the photodetector and the first time-measuring circuit to be gated with a time gate, the time gate enabling detection within a range of times including a time corresponding to the distance measured using triangulation.

In some embodiments, the camera system includes an array of pixels including the pixel, the array of pixels including a plurality of columns.

In some embodiments, the camera system further includes a second time-measuring circuit connected to a column of the plurality of columns, wherein: the column includes the pixel, and the second time-measuring circuit has a precision of 100 ns.

In some embodiments, the camera system further includes a pulse-lengthening circuit connected between the photodetector and the second time-measuring circuit.

According to an embodiment of the present invention, there is provided a method for measuring positions with a camera system, the camera system including: a first laser; and a camera, the camera including a pixel including a photodetector and a pixel circuit, the pixel circuit including a first time-measuring circuit, the first time-measuring circuit having a precision of 10 ns, the method including: illuminating a first object with the first laser; measuring a distance to a first object using triangulation; determining that the first object is more distant than a threshold distance; illuminating the first object with a flash; and measuring the distance to the first object using a direct time of flight measurement.

In some embodiments, the camera system further includes a second laser, and the illuminating of the first object with a flash includes illuminating the first object with a flash from the second laser.

In some embodiments: the first laser is steerable, and the illuminating of the first object with the first laser includes illuminating the first object with the first laser while performing a scan with the first laser.

According to an embodiment of the present invention, there is provided a camera system, including: a first laser; a camera; and means for processing connected to the first laser and to the camera, the first laser being steerable, the camera including a pixel including a photodetector and a pixel circuit, the pixel circuit including a first time-measuring circuit, the first time-measuring circuit having a precision of 10 ns.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
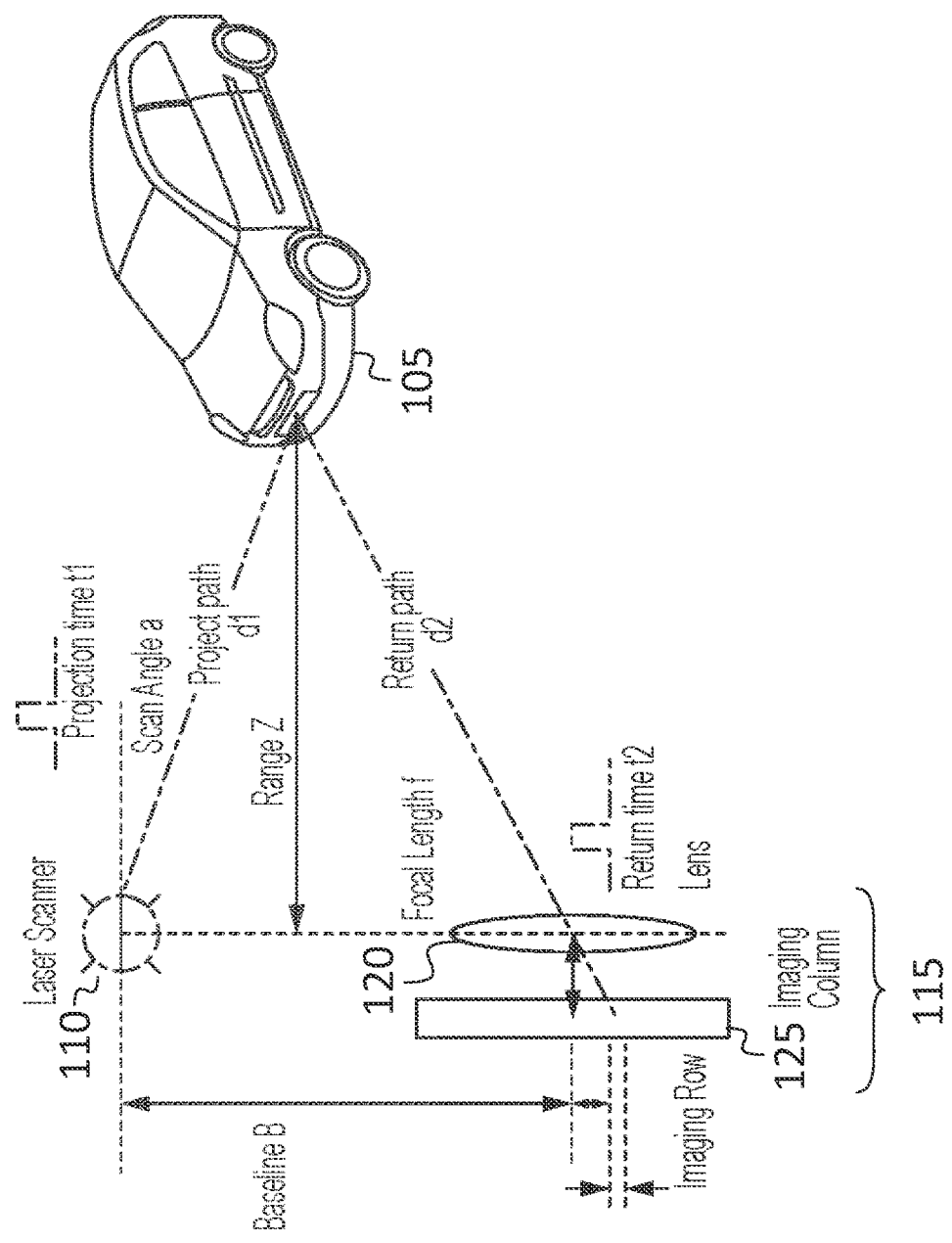
FIG. 1A is a schematic drawing of a three-dimensional camera system, according to an embodiment of the present disclosure.

The detailed description set forth below in connection with the appended drawings is intended as a description of exemplary embodiments of a three-dimensional camera system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Referring to FIG. 1, in some embodiments, a camera system for determining the locations of one or more objects 105 includes a first laser 110 (e.g., a steerable laser or "laser scanner") and a camera 115, which includes a lens 120 and an array of photodetectors 125. The array of photodetectors 125 may be arranged in rows and columns forming a rectangle, of which one column is illustrated.

In operation, the first laser 110 may be scanned, e.g., (i) swept horizontally across the field (e.g., the field of view of the camera 115) if the laser projects a vertical line, or (ii) scanned in a two-dimensional pattern (e.g., a raster scan, or another scan pattern that covers the field of view of the camera 115). When light reflects from an object 105 and into the camera 115, the system may use triangulation to measure distance to the object. For example, the system may infer the distance to the object 105 from disparity information (e.g., from the angle between the direction of the outgoing laser beam and the direction of the reflected light received by the camera 115). This angle may approach zero as the distance to an object 105 approaches infinity. The rate of change of the angle with distance to the object 105 may decrease with increasing distance to the object, and as a result the accuracy of the measurement may degrade significantly when the distance to the object is relatively large, e.g., greater than 10 times the lateral separation between the first laser 110 and the camera 115 or greater than 100 times the lateral separation between the first laser 110 and the camera 115.

Figure 1B:
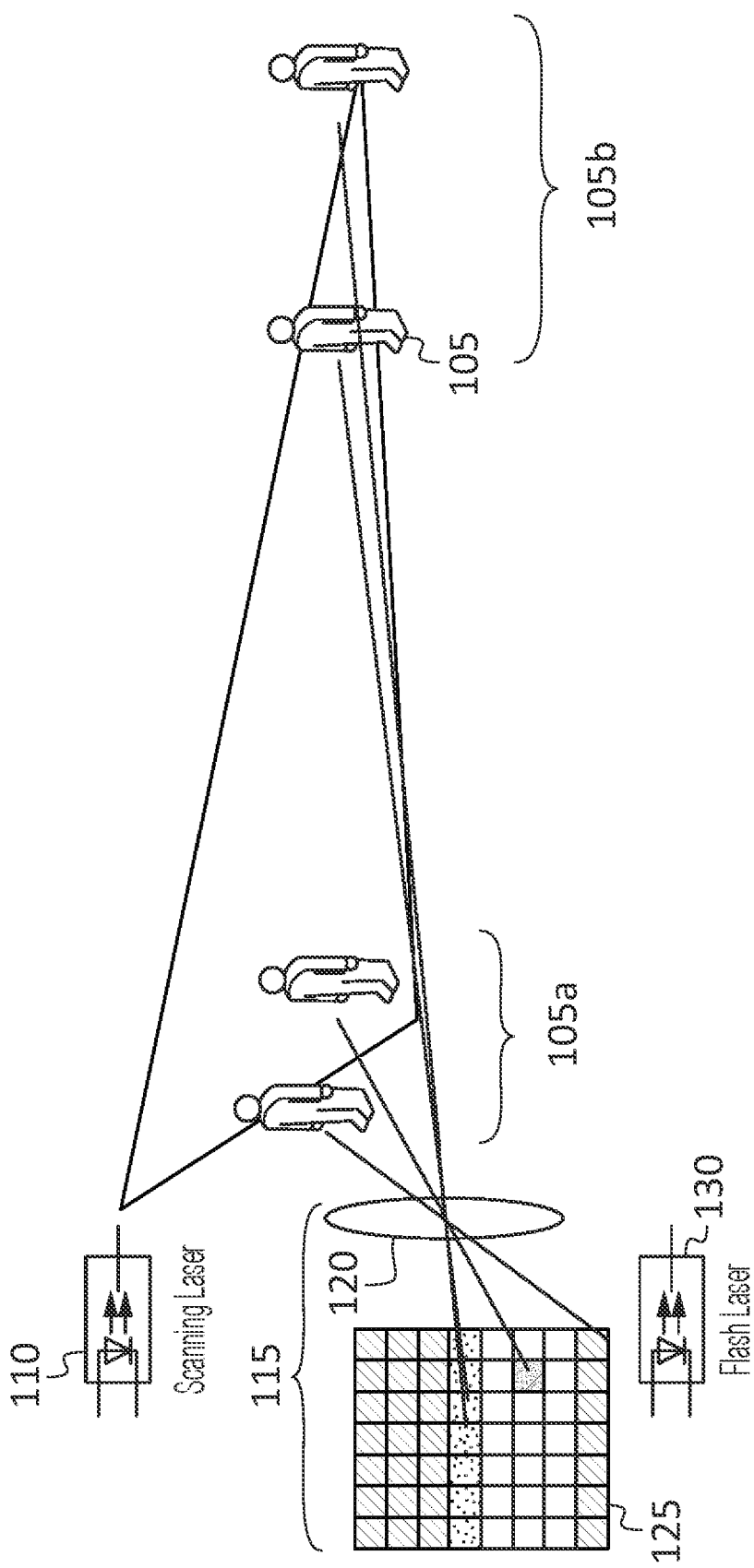
FIG. 1B is a schematic drawing of a three-dimensional camera system, according to an embodiment of the present disclosure.

Referring to FIG. 1B, the accuracy of distance measurements for distant objects may be improved by combining a direct time of flight distance measuring capability with the triangulation capability illustrated in FIG. 1A. In some embodiments, a second laser 130, which may be a flash laser (capable of producing a flash of light with a rise time or fall time that is sufficiently short for accurate timing, e.g., a rise time or a fall time of between 0.01 ns and 100.0 ns). For example, if the photodetectors 125 are suitable for detecting the beginning (e.g., the rise) of the reflected pulse, then the difference between the time of the beginning of the transmitted pulse and the beginning of the receipt of the reflected pulse may be measured, and the distance to the object 105 from which the pulse reflected may be calculated by multiplying one-half of the time difference by the speed of light. In some embodiments a single laser, capable both of providing continuous illumination for performing a scan, and of producing a flash with a short rise time, is used both to measure distance using triangulation and to measure distance using a direct time of flight measurement. A system, such as that of FIG. 1B, which includes a camera and a system for measuring the distance to an object 105, may be capable of measuring the position of the object in three dimensions, by measuring the direction to the object 105 from the position to which its image is projected, by the lens 120, on the array of photodetectors 125, and by measuring the object's distance from the camera system, e.g., using one or more of the methods described herein. As used herein, a "direct" time of flight measurement is one that measures the round-trip time of a pulse, as distinct from a system that, e.g., emits sinusoidally modulated light and compares the phase of the transmitted light with the phase of the light received after reflection from an object.

A system with both capabilities, a capability to measure distance using triangulation and a capability to measure distance using a direct time of flight measurement may operate as follows. The system may first perform a scan to measure the distance to each of one or more objects 105 in the field of view of the camera 115. For objects 105a that are relatively close to the camera system, the accuracy of the distance measurement using triangulation may be acceptable. For objects 105b that are relatively distant from the camera system, however, the accuracy of the distance measurement using triangulation may be poor, although it may be sufficient for the camera system to be able to determine that the objects are too distant for triangulation to achieve acceptable accuracy. As such, the camera system may perform a follow-up measurement, using the direct time of flight measurement, when the distance measurement using triangulation indicates that the object is more distant than a threshold distance (with the threshold distance being, e.g., 10 times the lateral separation between the first laser 110 and the camera 115 or 100 times the lateral separation between the first laser 110 and the camera 115).

To perform such a direct time of flight measurement, the second laser 130 may be aimed at the object 105 for which the direct time of flight measurement is to be performed (e.g., it may be aimed into a region of interest (ROI) in which the object is, according to the first measurement), the second laser may illuminate the object 105 with a flash, and the round-trip time of flight may be measured. The direct time of flight measurement for each such object may be time-gated (or, equivalently, range-gated), based on the distance measurement using triangulation, to reject ambient light more efficiently. Moreover, in some embodiments, only the pixel or pixels into which the light from the second laser is expected to reflect is or are enabled for the direct time of flight measurement. Such a pixel may be, e.g., (i) the same pixel that detected the reflection, of the light from the first laser, from the object during the scan, if the first laser and the second laser are co-located, or (ii) the pixel onto which the light is expected to be reflected from the second laser, based on the positions of the lasers and the camera, and the position of the object as calculated by the triangulation-based measurement.

Figure 2:
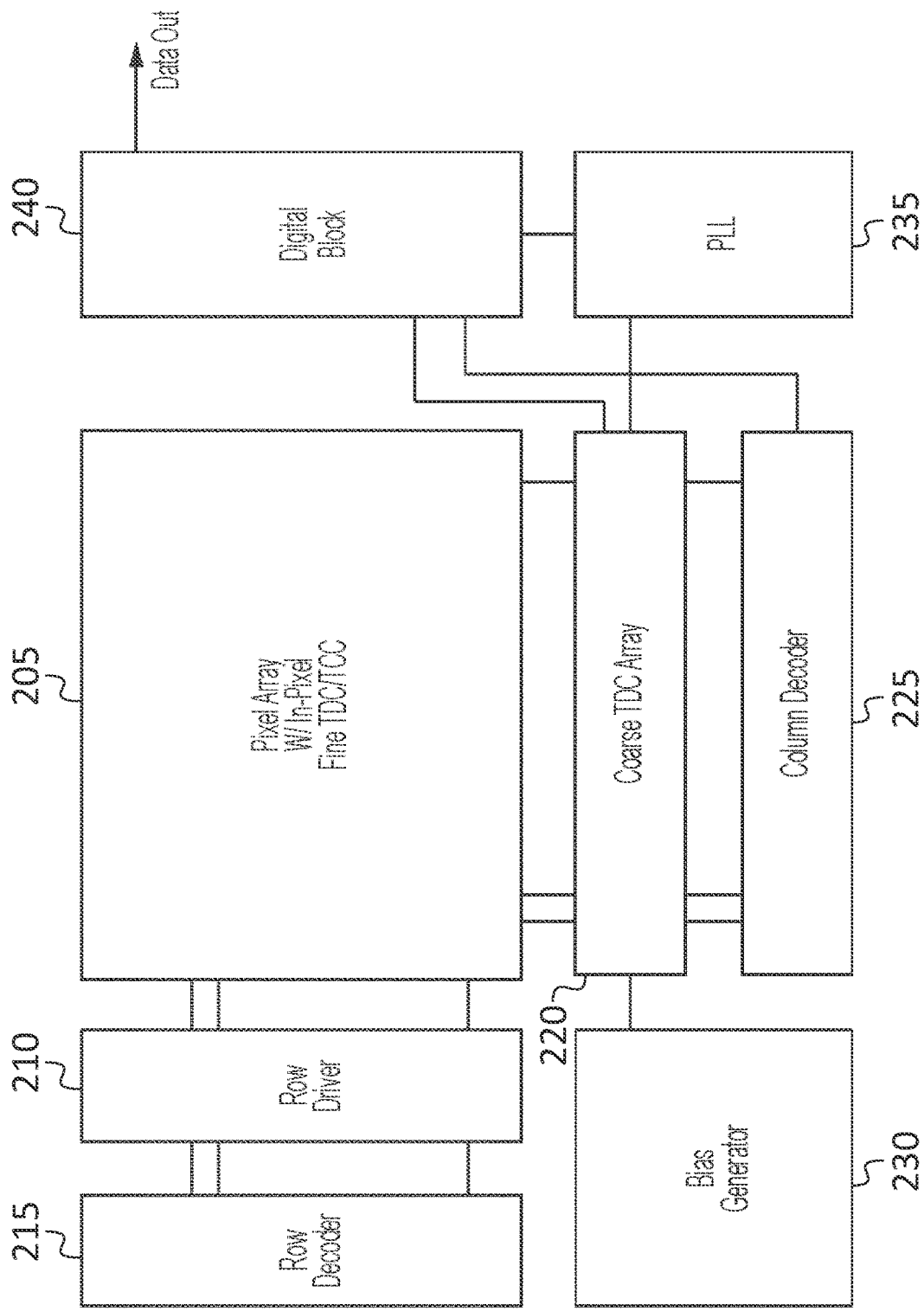
FIG. 2 is a block diagram of a portion of a three-dimensional camera system, according to an embodiment of the present disclosure.

FIG. 2 shows a block diagram for a portion of a camera system having both triangulation capability and a direct time of flight distance measuring capability, in some embodiments. The camera 115 includes a pixel array 205, each pixel of which includes a photodetector (of the array of photodetectors 125) and a pixel circuit (each of which includes a first (e.g., fine) time-measuring circuit), as discussed in further detail below. The rows of the pixel array 205 are selected and reset by a row driver 210, in turn controlled by a row decoder 215. The row decoder receives a binary row-select signal and in response turns on a row select line, of a plurality of such lines (one for each row of the pixel array 205) connected to the row driver 210. The row driver includes an array of drive circuits, each connected to a respective row of the pixel array 205, and configured to turn on switching transistors in the pixel circuits of the row, as discussed in further detail below.

An array of second (e.g., coarse) time-measuring circuits 220 (one for each of the columns of the pixel array 205) is connected to the columns of the pixel array 205. When the camera system is operating in scanning mode and a pixel in a currently selected row detects light reflected from an object 105, the coarse time-measuring circuit connected to the column containing the pixel may be employed to infer, from the time at which an object was illuminated, what the direction of the beam from the first laser 110 (the direction of which is a known function of time) was when the light detected by the pixel was emitted by the first laser 110. The triangulation algorithm may then employ (i) the direction of the beam when the light was emitted and (ii) the direction from which light is imaged onto the pixel, to estimate the distance to the object. A column decoder 225 may be employed to read out the contents of the coarse time-measuring circuits 220, and of the fine time-measuring circuits in the pixel circuits, one at a time.

A bias generator 230 may generate bias voltages or currents employed by the pixel array 205, a phase-locked loop 235 may generate a system clock for use by the digital circuits in the camera system, and a digital block 240 (which may be, or may be connected to, a processing circuit (discussed in further detail below)) may generate various digital control signals employed by the camera system. The components illustrated in FIG. 2 may be on a single die or on two dies, stacked one on top of the other. In a stacking design, only the photodiodes and a limited number of transistors in pixel may be on the top die, and the remainder of the circuitry may be on the bottom die. In a single die design, each pixel circuit may be immediately adjacent to the photodetector 125 to which it is connected.

Figure 3:
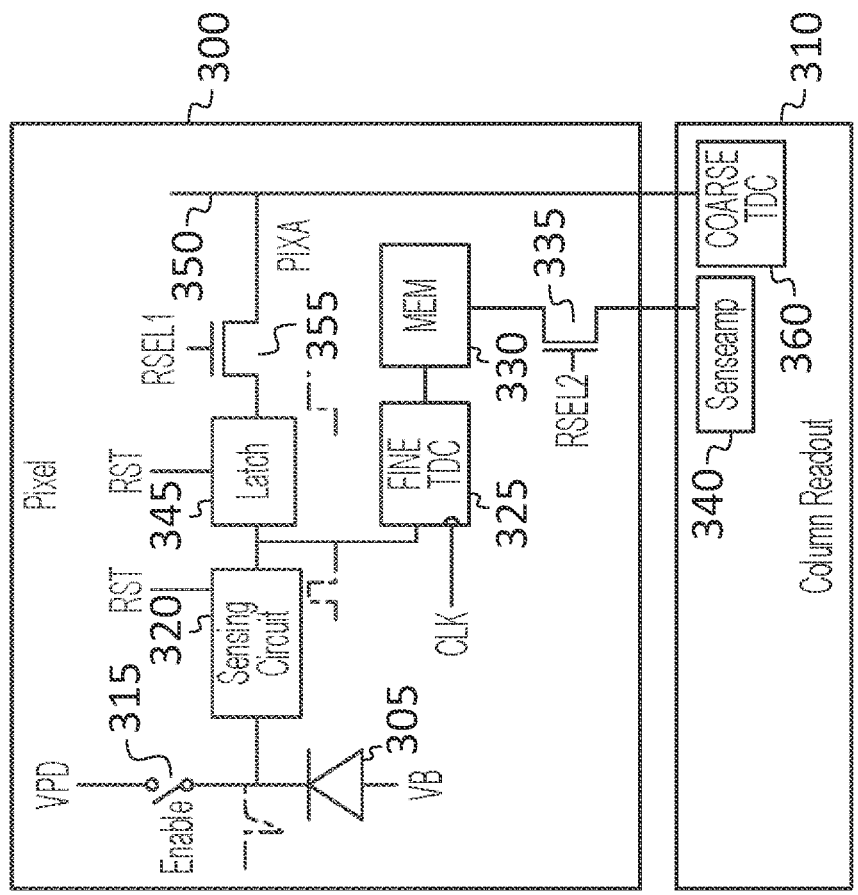
FIG. 3 is a schematic drawing of a portion of a three-dimensional camera system, according to an embodiment of the present disclosure.

FIG. 3 shows a pixel 300 of the pixel array 205 (the pixel including a photodetector 305 and a pixel circuit) connected to a column readout circuit 310. The photodetector 305 may be a single photon avalanche diode (SPAD) or an avalanche photodiode (APD). The pixel circuit includes an enable switch 315 (which may be used for time-gating the circuit, based on the distance measurement performed by triangulation), and a sensing circuit 320 (which may include an amplifier for amplifying the signal from the photodetector 305, and a comparator for converting the signal to a digital pulse). The pixel circuit may further include a fine time-measuring circuit 325 (e.g., (i) a time to digital converter (TDC) or (ii) a time to charge converter (TCC) connected to an analog to digital converter). The output of the fine time-measuring circuit 325 may be a digital number, which may be stored in a register (MEM) 330, to be read out later, through a second row select transistor 335 (RSEL2), by a sense amplifier 340 in the column readout circuit 310. The signal from the sensing circuit 320 (which may be a short pulse) may be connected to a pulse-lengthening circuit 345 (which may be constructed using a latch) and fed to a column readout conductor 350 through a first row select transistor 355 (RSEL1). The gates of the first row select transistor 355 second row select transistor 335 may be driven by the row driver 210 (FIG. 2) The pulse-lengthening circuit 345 may lengthen the pulse sufficiently to be reliably transmitted to the coarse time-measuring circuit 360 in the presence of potentially significant loading by the column readout conductor 350. In some embodiments, the fine time-measuring circuit 325, instead of being connected directly to the output of the sensing circuit 320, as shown in FIG. 3, is connected to the output of the pulse-lengthening circuit 345.

As mentioned above, the fine time-measuring circuit 325 may include a time to digital converter (TDC). The time to digital converter may include a counter configured to count clock cycles (e.g., cycles of the system clock) between a start trigger and an end trigger. For example, the system may send, to the time to digital converter, a start trigger when the second laser 130 emits a flash, and the sensing circuit 320 may send, to the time to digital converter, an end trigger, e.g., a pulse corresponding to light reflected from the object being detected. In other embodiments, the pulse corresponding to light reflected from the object being detected may be used as the start trigger, and a stop trigger (e.g., generated by the digital block 240 (FIG. 2)) may be produced by the system clock a fixed amount of time after the emission of the flash by the second laser 130. In the latter embodiment, the count stored in the register 330, by the time to digital converter, when it receives the end trigger, may be proportional to the difference between (i) the amount of time between the emission of the flash by the second laser 130 and generation of the stop trigger and (ii) the round-trip travel time of the flash. The latter embodiment may consume less power than the former, e.g., in a case in which multiple flashes of the second laser 130 are used and most of the flashes do not result in a detection in the pixel, because when no detection occurs, the counter of the time to digital converter does not run.

A time to charge converter may be a circuit which (i) charges a capacitor with a constant current beginning when a start trigger is received and which (ii) then samples the voltage on the capacitor when an end trigger is received. The sampled voltage is then converted to digital form using an analog to digital converter. The constant current may be produced by a current mirror, the reference arm of which is based on the current flowing into a capacitor to which is a applied a voltage ramp, i.e., a linearly varying voltage, which may be generated by the bias generator 230 (FIG. 2).

The coarse time-measuring circuit 360 may have a precision of 100 ns, and the fine time-measuring circuit 325 may have a precision of 10 ns. As used herein, "having a precision" means includes having a superior precision, so that, for example a time-measuring circuit having a precision of 100 nanoseconds (ns) is also a time-measuring circuit having a precision of 1 microsecond.

In some embodiments the system is controlled by a processing circuit, which may control, for example, (i) the steering of the first laser 110 and of the second laser 130, (ii) the emission of flashes by the second laser and (iii) the resetting of the array of photodetectors 125, and which may perform the calculations of distance using triangulation, and command mode changes between scanning mode and flash mode, and designate a region of interest when flash mode is used. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing.

As used herein, the term "array" refers to an ordered set of numbers regardless of how stored (e.g., whether stored in consecutive memory locations, or in a linked list). As used herein, the term "rectangle" includes a square as a special case, i.e., a square is an example of a rectangle. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. For example, if a first component is "connected to" a second component, a third component may be connected between the first component and the second component (e.g., a first side of the third component may be connected to the first component, and a second side of the third component may be connected to the second component). In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a three-dimensional camera system have been specifically described and illustrated herein, many modifications and variations will be apparent to those skilled in the art. Accordingly, it is to be understood that a three-dimensional camera system constructed according to principles of this disclosure may be embodied other than as specifically described herein. The invention is also defined in the following claims, and equivalents thereof.

What is claimed is:

1. A camera system comprising:
   a readout circuit; and
   a pixel connected to the readout circuit via a first line, and a second line different from the first line, the pixel comprising a photodetector, and a pixel circuit comprising:
      a sensing circuit connected between the photodetector and the first line to output a signal corresponding to light detected by the photodetector to the readout circuit via the first line as a first distance measurement; and
      a first time-measuring circuit connected between the sensing circuit and the second line to output a second distance measurement according to a pulse of light detected by the photodetector to the readout circuit via the second line.

2. The camera system of claim 1, wherein the first time-measuring circuit comprises a digital converter circuit connected between a node and the second line, the node being located between the sensing circuit and the first line.

3. The camera system of claim 2, wherein the digital converter circuit comprises a time to digital converter circuit, and
   wherein the pixel circuit further comprises a register to store a count generated by the time to digital converter circuit.

4. The camera system of claim 3, wherein the time to digital converter circuit comprises a counter to start counting upon receipt of start trigger, and to store a count value in the register in response to receipt of a detection pulse from the photodetector.

5. The camera system of claim 2, wherein the digital converter circuit comprises a time to charge converter circuit.

6. The camera system of claim 1, wherein the readout circuit comprises:
   a second time-measuring circuit connected to the first line to receive the first distance measurement, the second time-measuring circuit having a precision lower than that of the first time-measuring circuit; and
   a sense amplifier connected to the second line to receive the second distance measurement.

7. The camera system of claim 1, wherein the sensing circuit comprises an amplifier and a comparator.

8. The camera system of claim 1, further comprising a processing circuit configured to:
   measure a first distance to an object using triangulation according to the first distance measurement;
   determine that the object is more distant than a threshold distance; and
   measure a second distance to the object using a direct time of flight measurement according to the second distance measurement.

9. A pixel of a camera system, comprising:
   a photodetector; and
   a pixel circuit comprising:
      a sensing circuit connected between the photodetector and a readout line to output a signal corresponding to light detected by the photodetector to a readout circuit via the readout line as a first distance measurement; and
      a first time-measuring circuit connected between the sensing circuit and a different line from that of the readout line to output a second distance measurement according to a pulse of light detected by the photodetector to the readout circuit via the different line.

10. The pixel of claim 9, wherein the first time-measuring circuit comprises a digital converter circuit connected between a node and the different line, the node being located between the sensing circuit and the readout line.

11. The pixel of claim 10, wherein the digital converter circuit comprises a time to digital converter circuit, and
    wherein the pixel circuit further comprises a register to store a count generated by the time to digital converter circuit.

12. The pixel of claim 11, wherein the time to digital converter circuit comprises a counter to start counting upon receipt of start trigger, and to store a count value in the register in response to receipt of a detection pulse from the photodetector.

13. The pixel of claim 10, wherein the digital converter circuit comprises a time to charge converter circuit.

14. The pixel of claim 9, wherein the readout circuit comprises:
    a second time-measuring circuit connected to the readout line to receive the first distance measurement, the second time-measuring circuit having a precision lower than that of the first time-measuring circuit; and
    a sense amplifier connected to the different line to receive the second distance measurement.

15. The pixel of claim 9, wherein the sensing circuit comprises an amplifier and a comparator.

16. A method for measuring a position of an object with a camera system,
    the camera system comprising:
       a readout circuit; and
       a pixel connected to the readout circuit via a first line, and a second line different from the first line, the pixel comprising a photodetector, and a pixel circuit comprising:
          a sensing circuit connected between the photodetector and the first line to output a signal corresponding to light detected by the photodetector to the readout circuit via the first line as a first distance measurement; and
          a first time-measuring circuit connected between the sensing circuit and the second line to output a second distance measurement according to a pulse of light detected by the photodetector to the readout circuit via the second line,
    the method comprising:
       illuminating an object with a laser;
       determining a first distance to the object using triangulation according to the first distance measurement received via the first line;
       determining that the object is more distant than a threshold distance;
       illuminating the object with a flash; and
       determining a second distance to the object using a direct time of flight measurement according to the second distance measurement received via the second line.

17. The method of claim 16, wherein the first time-measuring circuit comprises a digital converter circuit connected between a node and the second line, the node being located between the sensing circuit and the first line.

18. The method of claim 17, wherein the digital converter circuit comprises a time to digital converter circuit, and
wherein the pixel circuit further comprises a register to store a count generated by the time to digital converter circuit.

19. The method of claim 18, wherein the time to digital converter circuit comprises a counter to start counting upon receipt of start trigger, and to store a count value in the register in response to receipt of a detection pulse from the photodetector.

20. The method of claim 17, wherein the digital converter circuit comprises a time to charge converter circuit.

\* \* \* \* \*